(12) United States Patent
Zhang et al.

(10) Patent No.: US 11,219,082 B2
(45) Date of Patent: Jan. 4, 2022

(54) BASE STATION, USER EQUIPMENT, AND RELATED METHOD

(71) Applicants: SHARP KABUSHIKI KAISHA, Sakai (JP); FG INNOVATION COMPANY LIMITED, Tuen Mun (HK)

(72) Inventors: Chongming Zhang, Shanghai (CN); Renmao Liu, Shanghai (CN)

(73) Assignees: SHARP KABUSHIKI KAISHA, Sakai (JP); FG Innovation Company Limited, Tuen Mun (HK)

(*) Notice: Subject to any disclaimer, the term of this patent is extended or adjusted under 35 U.S.C. 154(b) by 130 days.

(21) Appl. No.: 16/496,087

(22) PCT Filed: Mar. 20, 2018

(86) PCT No.: PCT/CN2018/079581
§ 371 (c)(1),
(2) Date: Sep. 20, 2019

(87) PCT Pub. No.: WO2018/171577
PCT Pub. Date: Sep. 27, 2018

(65) Prior Publication Data
US 2021/0112617 A1    Apr. 15, 2021

(30) Foreign Application Priority Data
Mar. 24, 2017 (CN) .......................... 201710186104.X

(51) Int. Cl.
H04W 76/19    (2018.01)
H04W 76/15    (2018.01)
(Continued)

(52) U.S. Cl.
CPC ........... *H04W 76/19* (2018.02); *H04W 76/15* (2018.02); *H04W 80/02* (2013.01); *H04W 84/18* (2013.01)

(58) Field of Classification Search
CPC ..... H04W 76/19; H04W 76/15; H04W 80/02; H04W 84/18
See application file for complete search history.

(56) References Cited

U.S. PATENT DOCUMENTS 10,959,178 B2 * 3/2021 Ali .................. H04W 76/27
2012/0083263 A1   4/2012 Kim et al.
(Continued)

FOREIGN PATENT DOCUMENTS

CN    103229540 A    7/2013
WO    2015/060543 A1    4/2015

OTHER PUBLICATIONS

Huawei, "SRB type identification over F1 and X2 interface for Cu—Du", R3-173132, 3GPP TSG RAN WG3 meeting #97, Berlin, Germany, Aug. 21-25, 2017.
(Continued)

*Primary Examiner* — Will W Lin
(74) *Attorney, Agent, or Firm* — ScienBiziP, P.C.

(57) ABSTRACT

The present disclosure provides a method used in user equipment (UE), the user equipment being provided with one or more signaling radio bearers (SRBs) comprising a master cell group (MCG) split SRB and/or one or more secondary cell group (SCG) SRBs, and the method comprising: detecting a radio link failure between the UE and an MCG base station; determining, in the configured one or more SRBs, one or more SRBs for transmitting a message related to the radio link failure; and transmitting the message by means of the determined one or more SRBs.

4 Claims, 6 Drawing Sheets

(51) Int. Cl.
  *H04W 80/02*  (2009.01)
  *H04W 84/18*  (2009.01)

(56) References Cited

U.S. PATENT DOCUMENTS

| | | | |
|---|---|---|---|
| 2016/0057585 A1* | 2/2016 | Horn | H04L 45/245 |
| | | | 370/312 |
| 2017/0171903 A1* | 6/2017 | Kubota | H04L 41/0672 |
| 2018/0184362 A1* | 6/2018 | Babaei | H04W 48/16 |
| 2018/0279401 A1* | 9/2018 | Hong | H04J 11/0086 |
| 2019/0208474 A1* | 7/2019 | Ali | H04W 84/20 |
| 2019/0254101 A1* | 8/2019 | Lee | H04W 76/19 |
| 2019/0289510 A1* | 9/2019 | Rugeland | H04W 36/30 |
| 2020/0113012 A1* | 4/2020 | Lee | H04W 28/02 |

OTHER PUBLICATIONS

Ericsson, "RLM and RLF in case of LTE-NR tight interworking", R2-1700918, 3GPP TSG-RAN WG2 #97, Athens, Greece, Feb. 13-17, 2017.
Ericsson, "Further discussion of split SRB for LTE-NR interworking", R2-1700915, 3GPP TSG-RAN WG2 #97, Athens, Greece, Feb. 13-17, 2017.
Ericsson, "RRC signaling transport for LTE-NR interworking not involving coordination", R2-1700917, 3GPP TSG-RAN WG2 #97, Athens, Greece, Feb. 13-17, 2017.
TRI, "RRC message related issues for LTE-NR tight interworking", Tdoc R2-166494, 3GPP TSG-RAN WG2 Meeting#95bis Kaohsiung, Oct. 10-14, 2016.
NTT DOCOMO, "New SID Proposal: Study on New Radio Access Technology", RP-160671, 3GPP TSG RAN Meeting #71 Goteborg, Sweden, Mar. 7-10, 2016.

\* cited by examiner

BASE STATION, USER EQUIPMENT, AND RELATED METHOD

TECHNICAL FIELD

The present disclosure relates to the wireless communication technologies field. More specifically, the present disclosure relates to user equipment, a base station, and related methods.

BACKGROUND

With the rapid growth of mobile communications and great progress of technology, the world will move toward a fully interconnected network society where anyone or anything can acquire information and share data anytime and anywhere. It is estimated that there will be 50 billion interconnected devices by 2020, of which only about 10 billion may be mobile phones and tablet computers. The rest are not machines communicating with human beings but machines communicating with one another. Therefore, how to design a system to better support the Internet of Everything is a subject needing further and intensive research.

For this purpose, at the 3rd Generation Partnership Project (3GPP) RAN #64 plenary session held in March 2016, a research subject on new 5G radio access technology was proposed (see non-patent literature: RP-160671 New SID Proposal: Study on New Radio Access Technology). In the description of this work project, it is stated that the working frequency band of the future new communication system can be extended to 100 GHz, which can satisfy at least the requirements of enhanced mobile broadband services, the communication requirements of a large number of sets of user equipment (UI) in the Internet of Things, and the requirements of services requiring high reliability. The research conducted on this project ends in 2018.

The research of this subject includes research on the application in a dual connectivity (DC) scenario. In an NR DC scenario, a master cell group (MCG) split signaling radio bearer (SRB) and a secondary cell group (SCG) SRB can be supported, so as to support a larger transmission rate and reliable signaling transport. The MCG split SRB is mainly used to ensure transmission reliability. Control information generated by an MCG base station can be transmitted to UE via an MCG air interface and an SCG air interface simultaneously, so as to implement repeated signaling transmission and provide transmission reliability. The SCG SRB is used to achieve control timeliness, and in a conventional long term evolution (LTE) DC scenario, all of the measurement, reconfiguration, and the like of an SCG need to be transmitted to an MeNB via an interface between the MeNB (Master eNB, namely the MCG base station) and an SeNB (Secondary eNB, namely the SCG base station), and then transmitted to the UE by the MeNB, thereby introducing an inevitable delay. In the NR DC scenario, information such as the measurement and reconfiguration described above can be directly transmitted to the UE by means of the SCG SRB, thereby ensuring the effectiveness and real-time performance of link management.

The prior art "R2-1700918 RLM and RLF in case of LTE-NR tight interworking" points out when UE detects an MCG radio link failure, UE can make a notification to an MCG base station by means of an MCG split SRB so that the MCG base station performs further processing; moreover, the prior art "R2-1701344 Control plane signalling transport for LTE-NR tight interworking" points out that when UE detects an MCG radio link failure, UE can make a notification to an MCG base station by means of an SCG SRB, so that the MCG base station performs further processing.

In the NR DC scenario, since the MCG split SRB and the SCG SRB have respective different functions, a base station can configure one or two types of the two types of SRBs for a user. In this case, the problem to be solved is how UE transmits a message carrying MCG radio link failure information if the UE detects that a radio link failure occurs in an MCG. Further, a similar problem needs to be solved in an NR scenario where multiple connections are configured.

SUMMARY

According to a first aspect of the present disclosure, a method used in user equipment (UE) is provided, the user equipment being provided with one or more signaling radio bearers (SRBs) comprising a master cell group (MCG) split SRB and/or one or more secondary cell group (SCG) SRBs, and the method comprising: detecting a radio link failure between the UE and an MCG base station, determining, in the configured one or more SRBs, one or more SRBs for transmitting a message related to the radio link failure; and transmitting the message by means of the determined one or more SRBs.

In an embodiment, the method described above further comprises: receiving an indication from the MCG base station or an SCG base station, the indication being used for determining that the message is transmitted by means of the MCG split SRB and/or one or more of the one or more SCG SRBs, wherein the determination is based at least in part on the received indication.

In an embodiment, the determination comprises: detecting whether the configured one or more SRBs operate normally, wherein the one or more SRBs for transmitting the message is determined only in normally operating SRBs.

In an embodiment, the determination further comprises: detecting link quality of the normally operating SRB, wherein the one or more SRBs for transmitting the message is determined based on the detected link quality.

In an embodiment, the method described above further comprises: after detecting the radio link failure of the MCG base station and before transmitting the message, suspending all MCG data radio bearers (DRBs), and suspending transmission of the MCG split SRB in an MCG.

According to a second aspect of the present disclosure, a method used in user equipment (UE) is provided, comprising: detecting a radio link failure between the UE and a master cell group (MCG) base station; and transmitting a message related to the radio link failure between the UE and the MCG base station to an SCG base station by means of a physical uplink control channel (PUCCH) or a medium access control (MAC) control element (CE) of a secondary cell group (SCG).

According to a third aspect of the present disclosure, user equipment (UE) is provided, comprising a transceiver, a processor, and a memory, the memory storing an instruction executable by the processor so that the user equipment executes the method according to the first or second aspect described above.

According to a fourth aspect of the present disclosure, a method used in a base station is provided, comprising: transmitting an indication to user equipment (UE), the indication being used by the UE for determining that a message related to a radio link failure between the UE and an MCG base station is transmitted by means of a master cell group (MCG) split signaling radio bearer (SRB) and/or one or more of one or more secondary cell group (SCG) SRBs.

In an embodiment, the base station is an SCG base station, and the method described above further comprises: receiving the message from the UE; determining the radio link failure of the MCG base station by reading the message; and transmitting a notification related to the radio link failure to the MCG base station.

According to a fifth aspect of the present disclosure, a base station is provided, comprising a transceiver, a processor, and a memory, the memory storing an instruction executable by the processor so that the base station executes the method according to the fourth aspect described above.

BRIEF DESCRIPTION OF THE DRAWINGS

The above and other features of the present disclosure will become more apparent with the following detailed description in conjunction with the accompanying drawings.

DETAILED DESCRIPTION

The following describes the present invention in detail with reference to the accompanying drawings and specific embodiments. It should be noted that the present invention is not limited to the specific embodiments described below. In addition, for simplicity, detailed description of the known art not directly related to the present invention is omitted to prevent confusion with respect to the understanding of the present invention.

Multiple embodiments according to the present invention are described in detail below, with an NR mobile communications system and its subsequent evolved version serving as exemplary application environments, and with a base station and a UE device that support NR serving as examples. However, it should be noted that the present invention is not limited to the following embodiments, but is applicable to more other wireless communications systems, such as an enhanced long term evolution (eLTE) communications system, and is applicable to other base stations and UE devices, such as base stations and UE devices supporting eLTE.

The NR DC scenario includes, but is not limited to, the following combinations:

an MCG-related base station is an NR base station, and an SCG-related base station is an NR base station;

an MCG-related base station is an NR base station, and an SCG-related base station is an LTE or eLTE base station; and an MCG-related base station is an LTE or eLTE base station, and an SCG-related base station is an NR base station.

Prior to the specific description, several terms mentioned in the present invention are illustrated as follows. The terms involved in the present invention shall have the meanings set forth below, unless otherwise indicated.

UE: User Equipment
MCG: Master Cell Group
SCG: Secondary Cell Group
DC: Dual Connectivity
SRB: Signaling Radio Bearer
Split SRB: Split Signaling Radio Bearer
RLF: Radio Link Failure
NR: New Radio
LTE: Long Term Evolution
eLTE: Enhanced Long Term Evolution
RRC: Radio Resource Control
PDCP: Packet Data Convergence Protocol (layer)
RLC: Radio Link Control (layer)
MAC: Medium Access Control (layer)
PHY: Physical Layer
MeNB: Master eNB (MCG base station)
SeNB: Secondary eNB (SCG base station)
MAC CE: Medium Access Control Control Element
PUCCH: Physical Uplink Control Channel In addition, the SRB described below refers to a signaling radio bearer for the transmission of signaling between a base station and UE, especially control signaling, and the SRB can be further used for the transmission of signaling message of the non-access stratum.

Figure 1:
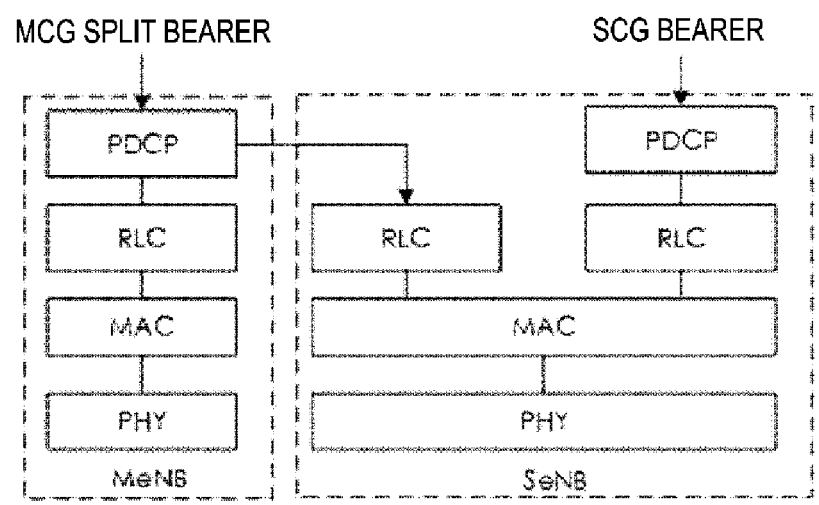
FIG. 1 illustrates a diagram of an MCG/SCG protocol architecture.

An MCG split bearer refers to a radio bearer established between an MCG base station and UE, and the bearer uses both MCG and SCG resources. One of the implementations of the protocol architecture thereof can be as shown in FIG. 1, wherein an MCG split Bearer for transmission of control signaling is referred to as an MCG split SRB.

An SCG bearer refers to a radio bearer established between the SCG base station and the UE, which uses only an SCG resource. One of the implementations of the protocol architecture thereof can be as shown in FIG. 1, wherein an SCG bearer for transmitting control signaling is referred to as an SCG SRB.

Figure 2:
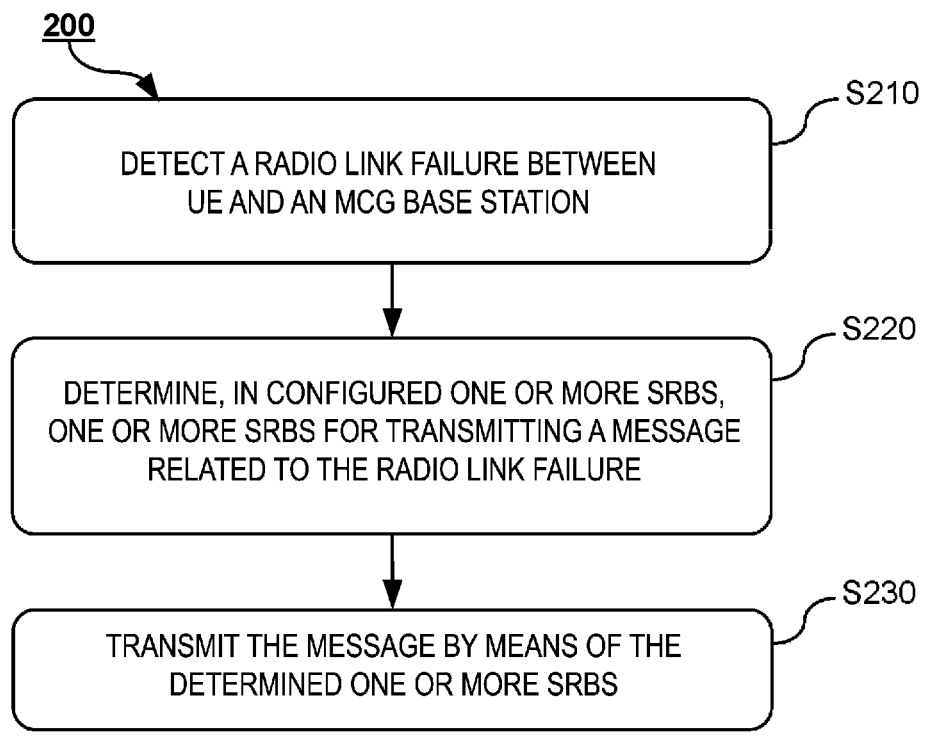
FIG. 2 illustrates a flowchart of a method used in user equipment according to an embodiment of the present disclosure.

FIG. 2 illustrates a flowchart of a method 200 used in user equipment (UE) according to an embodiment of the present disclosure. The user equipment is provided with one or more signaling radio bearers (SRBs) including a master cell group (MCG) split SRB and/or one or more secondary cell group (SCG) SRBs. The method 200 include the following steps.

In step S210, a radio link failure between the UE and an MCG base station is detected.

There are various causes of the radio link failure (RLF) between the UE and the MCG base station, which include but are not limited to the following cases: continuous MCG physical layer radio link detection desynchronization; a random access failure of MCG MAC; an indication that an MCG SRB/DRB or MCG split SRB/DRB reaches/exceeds a maximum number of retransmissions in an RLC layer of the MCG; and the like. If a UE detects one or more of the cases described above, it is considered that the radio link failure between the UE and the MCG base station, namely, MCG RLF, is detected.

In step S220, one or more SRBs used to transmit a message related to the radio link failure are determined in configured one or more SRBs.

In step S230, the message is transmitted via the determined one or more SRBs.

In an embodiment, the UE can transmit, always via the MCG split SRB, the message carrying MCG RLF information. Or, the UE can transmit, always via an SCG SRB, the message carrying the MCG RLF information.

In another embodiment, the method 200 further includes: receiving an indication from the MCG base station or an SCG base station, the indication being used for directly or indirectly determining that the message is transmitted via the MCG split SRB and/or one or more of the one or more SCG SRBs. In step S220, the determination is based at least in part on the received indication.

For example, before transmitting the message carrying the MCG RLF information, the UE receives information transmitted by the base station. This information carries the indication indicating the type of an SRB on which the UE used to transmit (or preferably transmit) the message carrying the MCG RLF information. Specifically, the indication can be 1 bit, wherein 0 represents the MCG split SRB and 1 represents the SCG SRB, or 1 represents the MCG split SRB and 0 represents the SCG SRB.

In an embodiment, in step S220, the determination includes: detecting whether the configured one or more SRBs operate normally, wherein the one or more SRBs for transmitting the message is determined only in normally operating SRBs.

In an embodiment, in step S220, the determination further includes: detecting link quality of the normally operating SRB, wherein the one or more SRBs for transmitting the message is determined based on the detected link quality.

For example, after (or when) the UE detects the MCG RLF, the UE can perform one or more of the following operation manners:

Manner 1: The UE determines whether the MCG split SRB operates normally, including but not limited to one or more of the following aspects: determining whether the UE establishes the MCG split SRB, whether the base station configures the MCG split SRB for the UE, or whether the MCG split SRB is in an unsuspended state (namely, operating state, not suspended).

If determining that the MCG split SRB operates normally, then the UE transmits the message carrying the MCG RLF information via the MCG split SRB, wherein criteria for the normal operation can include but are not limited to one or more of the following aspects: for example, the UE establishes the MCG split SRB, the base station configures the MCG split SRB for the UE, or the MCG split SRB is in an unsuspended state (namely, operating state, not suspended). Optionally, the process of the UE transmitting the message carrying the MCG RLF information ends.

If the UE determines that the MCG split SRB operates abnormally, wherein criteria for the abnormal operation can include but are not limited to one or more of the following aspects: for example, the UE does not establish the MCG split SRB, the base station does not configure the MCG split SRB for the UE, or transmission of the MCG split SRB at an SCG side or an SCG bearer is in a suspended state (namely, suspended), then operations selectable for the UE include but are not limited to the following aspects:

Aspect 1: The UE further determines whether the SCG SRB operates normally. If the SCG SRB operates normally, the UE transmits the message carrying the MCG RLF information on the SCG SRB; if the SCG SRB operates abnormally, the UE cancels transmission of the message carrying the MCG RLF information or ends the process of transmitting the message carrying the MCG RLF information, and optionally, initiates a request for re-establishing a connection to the base station or triggers a process of re-establishing a connection.

Or

Aspect 2: The UE cancels transmission of the message carrying the MCG RLF information or ends the process of transmitting the message carrying the MCG RLF information, and optionally, initiates a request for re-establishing a connection to the base station or triggers a process of re-establishing a connection.

Manner 2: The UE determines whether the SCG SRB operates normally, including but not limited to one or more of the following aspects: determining whether the UE establishes the SCG SRB, whether the base station configures the SCG SRB for the UE, or whether the SCG SRB is in an unsuspended state (namely, operating state, not suspended).

If determining that the SCG SRB operates normally, then the UE determines to transmit the message carrying the MCG RLF information on the SCG SRB, wherein criteria for the normal operation can include but are not limited to one or more of the following aspects: for example, the UE establishes the SCG SRB, the base station configures the SCG SRB for the UE, or the SCG SRB is in an unsuspended state (namely, operating state, not suspended).

If the UE determines that the SCG SRB operates abnormally, wherein criteria for the abnormal operation can include but are not limited to one or more of the following aspects: for example, the UE does not establish the SCG SRB, the base station does not configure the SCG SRB for the UE, or the SCG SRB or an SCG bearer is in a suspended state (namely, suspended), then operations selectable for the UE include but are not limited to the following aspects:

Aspect 1: The UE further determines whether the MCG split SRB operates normally: if the MCG split SRB operates normally, the UE transmits the message carrying the MCG RLF information on the MCG split SRB; if the MCG split SRB operates abnormally, the UE cancels transmission of the message carrying the MCG RLF information or ends the process of transmitting the message carrying the MCG RLF information, and optionally, initiates a request for re-establishing a connection to the base station or triggers a process of re-establishing a connection.

Or

Aspect 2: The UE cancels transmission of the message carrying the MCG RLF information or ends the process of transmitting the message carrying the MCG RLF information, and optionally, initiates a request for re-establishing a connection to the base station or triggers a process of re-establishing a connection.

Manner 3: The UE determines whether the SCG SRB and the MCG split SRB operate normally. A specific determination procedure is as described above.

If the UE determines that only one type of SRB in the MCG split SRB and the SCG SRB operates normally, then the UE transmits the message carrying the MCG RLF information on only the normally operating SRB.

If the UE determines that both the MCG split SRB and the SCG SRB operate normally (not suspended), the UE can:
 transmit the message carrying the MCG RLF information on an SRB of a type indicated by the base station;
 randomly select one SBR in the MCG split SRB and the SCG SRB to transmit the message carrying the MCG RLF information;
 transmit the message carrying the MCG RLF information on both the MCG split SRB and the SCG SRB; or
 if the MCG split SRB and the SCG SRB respectively belong to different SCGs, the UE can compare radio link quality of the two SCGs, and the UE can select an SRB owned by an SCG corresponding to better radio link quality for transmission, for example, if the radio link quality of the SCG to which the MCG split SRB belongs is better than the radio link quality of the SCG to which the SCG SRB belongs, then the MCG split SRB is selected for transmission, or in an opposite situation, the SCG SRB is selected for transmission.

If the UE determines that both the SCG SRB and the MCG split SRB operate abnormally, then the UE cancels transmission of the message carrying the MCG RLF information or ends the process of transmitting the message carrying the MCG RLF information, and optionally, initiates a request for re-establishing a connection to the base station or triggers a process of re-establishing a connection.

Manner 4: The UE performs a determination according to an SRB type indicated by the base station, and a specific determination procedure is as described above. For example, if the base station indicates that the message carrying the MCG RLF information is transmitted (or preferably transmitted) on the SCG SRB, then the UE first determines whether the SCG SRB operates normally, and a subsequent processing flow is the same as that of Manner 2.

In this manner, the base station can further, for example, indicate that the message carrying the MCG RLF information is transmitted (or preferably transmitted) on the MCG split SRB, then the UE can first determine whether the MCG split SRB operates normally, and a subsequent processing flow is the same as that of Manner 1.

The UE can be provided with multiple SCGs, and thus be provided with multiple SCG SRBs, with each SCG SRB being used for communication between a different SCG base station and the UE.

In this case, in addition to indicating of the type of the SRB used for transmission, the base station can further indicate those SCGs of which SCG SRBs are used for transmitting the message carrying the MCG RLF information. Specific implementations include but are not limited to the following manners:

The base station configures an SCG1, SCG2, SCG1 SRB, SCG2 SRB, and MCG split SRB for the UE.

Manner 1: The base station indicates that the UE can transmit the message carrying the MCG RLF information by means of (or preferably by means of) the MCG split SRB.

After the UE detects the MCG RLF, the UE determines whether the MCG split SRB operates normally (a specific determination procedure is as described above), and if the MCG split SRB operates normally, then the UE transmits the message on the MCG split SRB.

If the MCG split SRB operates abnormally (a specific determination procedure is as described above), then the UE then determines whether the SCG SRB operates normally.

Manner 2: The base station indicates that the UE can transmit the message carrying the MCG RLF information by means of (or preferably by means of) the SCG SRB.

After the UE detects the MCG RLF, the UE determines whether the SCG1 SRB and the SCG2 SRB operate normally (a specific determination procedure is as described above).

If only one of the SCG1 SRB and the SCG2 SRB operates normally, then the message is transmitted on the normally operating SCG SRB; or
if both the SCG1 SRB and the SCG2 SRB operate normally, then:
the UE randomly selects an SCG SRB for transmission;
the UE compares link quality of two SCGs and selects an SCG SRB of an SCG with better radio link quality for transmission; or
transmission is performed on both the two SCG SRBs.

Manner 3: The base station indicates that the UE can transmit the message carrying the MCG RLF information by means of (or preferably by means of) the SCG SRB, and the base station further indicates that the message carrying the MCG RLF information can be transmitted by means of (or preferably by means of) the SCG1 SRB.

After the UE detects the MCG RLF, the UE determines whether the SCG1 SRB operates normally (a specific determination procedure is as described above), and if the SCG1 SRB operates normally, then the UE transmits the message on the SCG1 SRB.

If the SCG1 SRB operates abnormally, then the UE further determines whether the SCG2 SRB operates normally, and if the SCG2 SRB operates normally, then the UE transmits the message on the SCG2 SRB.

If the SCG2 SRB operates abnormally, the UE further determines whether the MCG split SRB operates normally, and if the MCG split SRB operates normally, the UE transmits the message on the MCG split SRB.

Manner 4: The base station indicates that the UE can transmit the message carrying the MCG RLF information by means of the MCG split SRB and the SCG SRB, or the base station makes no any indication.

After the UE detects the MCG RLF, the UE determines whether the MCG split SRB, the SCG1 SRB, and the SCG2 SRB operate normally (a specific determination procedure is as described above).

If only one of the MCG split SRB, the SCG1 SRB, and the SCG2 SRB operates normally, then the message is transmitted on the normally operating SRB; or
if at least two of the MCG split SRB, the SCG1 SRB, and the SCG2 SRB operate normally, then:
the UE randomly selects an SRB for transmission;
the UE compares link quality of the SCGs, and selects an SRB of an SCG with best radio link quality for transmission; or
transmission is performed on all of the normally operating SRBs.

In an example, the method 200 further includes: after detecting the radio link failure of the MCG base station and before transmitting the message, suspending all MCG data radio bearers (DRBs), and suspending transmission of the MCG split SRB in an MCG.

Figure 3:
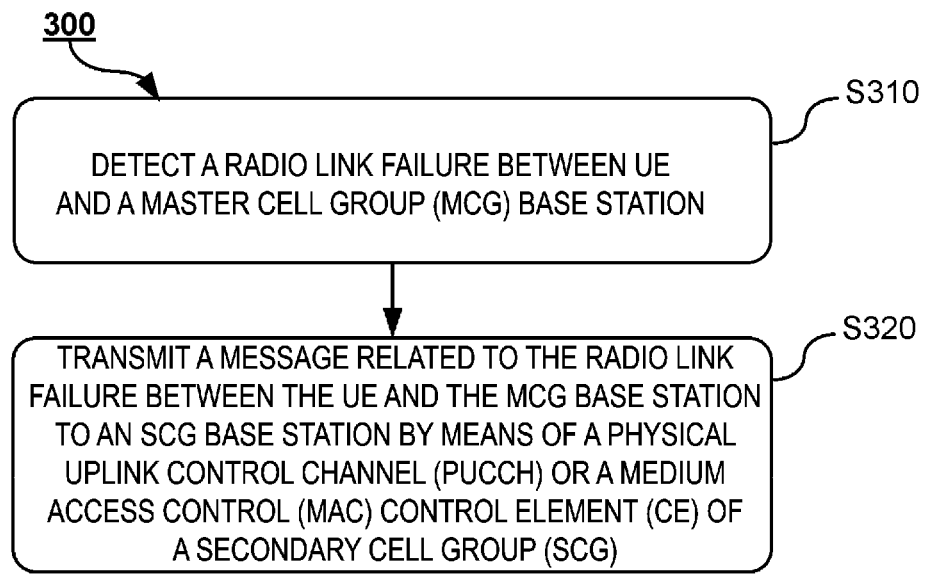
FIG. 3 illustrates a flowchart of a method used in user equipment according to another embodiment of the present disclosure.

FIG. 3 illustrates a flowchart of a method 300 used in user equipment according to another embodiment of the present disclosure. The method 300 includes the following steps.

In step S310, a radio link failure between the UE and an MCG base station is detected.

In step S320, a message related to the radio link failure between the UE and the MCG base station is transmitted to an SCG base station by means of a physical uplink control channel (PUCCH) or a medium access control (MAC) control element (CE) of a secondary cell group (SCG).

Specifically, if the UE detects that an RLF occurs in an MCG, the UE detects/determines whether an SCG is configured/established; if an SCG is configured/established, then an RRC layer of the UE notifies a MAC layer of the SCG, and the MAC layer generates a MAC CE indicating that an RLF occurs in the MCG; and optionally, the MAC layer make an indication/notification to a PHY layer, and information indicating the MCG RLF is transmitted by means of a PUCCH.

Figure 4:
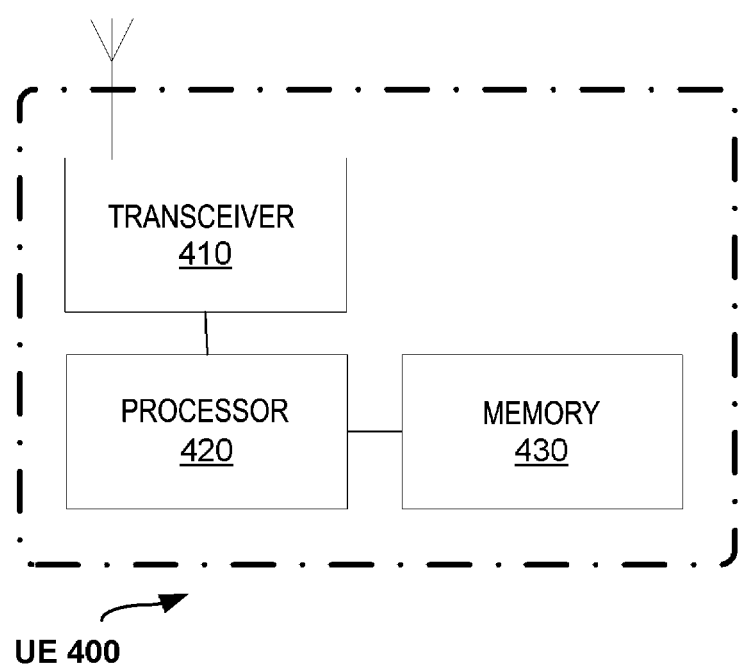
FIG. 4 illustrates a block diagram of user equipment according to an embodiment of the present disclosure.

The present disclosure provides user equipment (UE) corresponding to the method 200 and method 300 described above. FIG. 4 illustrates a block diagram of UE 400 according to an embodiment of the present disclosure. As shown in the figure, the UE 400 includes a transceiver 410, a processor 420, and a memory 430, wherein the memory 430 stores an instruction executable by the processor 420 so that the user equipment 400 executes the method 200 described above with reference to FIG. 2.

Specifically, the UE 400 detects a radio link failure between the UE and an MCG base station.

Further, the UE 400 determines, in configured one or more SRBs, one or more SRBs for transmitting a message related to the radio link failure.

Further, the UE 400 transmits the message by means of the determined one or more SRBs.

In an example, the UE 400 receives an indication from the MCG base station or an SCG base station, wherein the indication is used for determining that the message is transmitted by means of an MCG split SRB and/or one or more of the one or more SCG SRBs, and the determination is based at least in part on the received indication.

In an example, the determination includes: detecting whether the configured one or more SRBs operate normally, wherein the one or more SRBs for transmitting the message is determined only in normally operating SRBs.

In an example, the determination further includes: detecting link quality of the normally operating SRB, wherein the one or more SRBs for transmitting the message is determined based on the detected link quality.

In an example, after detecting the radio link failure of the MCG base station and before transmitting the message, the UE 400 suspends all MCG data radio bearers (DRBs), and suspends transmission of the MCG split SRB in an MCG.

Optionally, the memory 430 can store an instruction executable by the processor 420 so that the user equipment 400 executes the method 300 described above with reference to FIG. 3.

Specifically, the UE 400 detects a radio link failure between the UE and a master cell group (MCG) base station.

Further, the UE 400 transmits a message related to the radio link failure between the UE and the MCG base station to an SCG base station by means of a physical uplink control channel (PUCCH) or a medium access control (MAC) control element (CE) of a secondary cell group (SCG).

All of the aspects, features, and examples described above with respect to the method 200 or 300 are also applicable to the UE 400.

Figure 5:
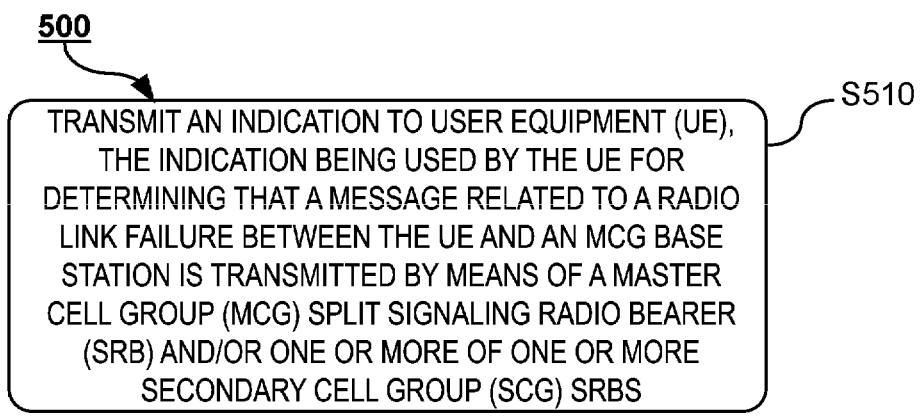
FIG. 5 illustrates a flowchart of a method used in a base station according to an embodiment of the present disclosure.

The present disclosure further provides a method used in a base station. FIG. 5 illustrates a flowchart of a method 500 used in a base station according to an embodiment of the present disclosure. As shown in the figure, the method 500 includes the following steps.

In step S510, an indication is transmitted to user equipment (UE), wherein the indication is used by the UE for determining that a message related to a radio link failure between the UE and an MCG base station is transmitted by means of a master cell group (MCG) split signaling radio bearer (SRB) and/or one or more of one or more secondary cell group (SCG) SRBs.

In an embodiment, the base station is an SCG base station, and the method 500 further includes: receiving the message from the UE; determining the radio link failure of the MCG base station by reading the message; and transmitting a notification related to the radio link failure to the MCG base station.

Figure 6:
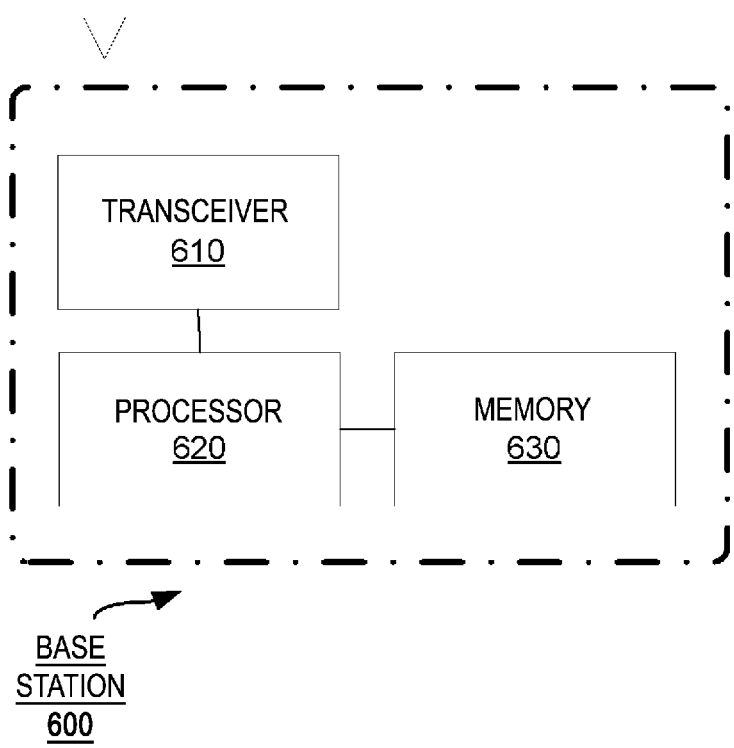
FIG. 6 illustrates a block diagram of a base station according to an embodiment of the present disclosure.

The present disclosure provides a base station corresponding to the method 500 described above. FIG. 6 illustrates a block diagram of a base station 600 according to an embodiment of the present disclosure. As shown in the figure, the base station 600 includes a transceiver 610, a processor 620, and a memory 630, wherein the memory 630 stores an instruction executable by the processor 620 so that the base station 600 executes the method 500 described above with reference to FIG. 5.

Specifically, the base station 600 transmits an indication to user equipment (UE), wherein the indication is used by the UE for determining that a message related to a radio link failure between the UE and an MCG base station is transmitted by means of a master cell group (MCG) split signaling radio bearer (SRB) and/or one or more of one or more secondary cell group (SCG) SRBs.

All of the aspects, features, and examples described above with respect to the method 500 are also applicable to the base station 600.

The program running on the device according to the present invention may be a program that enables the computer to implement the functions of the embodiments of the present invention by controlling a central processing unit (CPU). The program or information processed by the program can be stored temporarily in a volatile memory (for example, a random access memory (RAM), a hard disk drive (HDD), a non-volatile memory (for example, a flash memory), or other memory systems.

The program for implementing the functions of the embodiments of the present invention may be recorded on a computer-readable recording medium. The corresponding functions can be achieved by reading programs recorded on the recording medium and executing them by the computer system. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or more embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as UE devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the above embodiments may be replaced with one another.

The invention claimed is:

1. User equipment (UE), comprising:
a processor; and
a memory in electronic communication with the processor, wherein instructions stored in the memory are executable to:
detect a radio link failure for a master cell group (MCG);
determine whether the UE is configured with a MCG split signaling radio bearer (SRB);
determine whether the UE is configured with a secondary cell group (SCG) SRB;
in a case that the UE is configured with the MCG split SRB, transmit, via the MCG split SRB, a message carrying MCG failure information; and
in a case that the UE is configured with the SCG SRB, transmit the message via the SCG SRB, wherein
the instructions are further executable to:
suspend all MCG transmission for data radio bearers (DRBs); and
suspend transmission of the MCG split SRB in the MCG.

2. The UE according to claim 1, wherein the instructions are further executable to:
determine whether SCG transmission is suspended; and
in a case that the SCG transmission is suspended, trigger a procedure of re-establishing a connection.

3. A method used in user equipment (UE), comprising:
detecting a radio link failure for a master cell group (MCG);
determining whether the UE is configured with a MCG split signaling radio bearer (SRB);
determining whether the UE is configured with a secondary cell group (SCG) SRB;
in a case that the UE is configured with the MCG split SRB, transmitting, via the MCG split SRB, a message carrying MCG failure information; and
in a case that the UE is configured with the SCG SRB, transmitting the message via the SCG SRB, wherein
suspending all MCG transmission for data radio bearers (DRBs); and
suspending transmission of the MCG split SRB in the MCG.

4. The method used in the UE according to claim 3, further comprising:
determining whether SCG transmission is suspended; and
in a case that the SCG transmission is suspended, triggering a procedure of re-establishing a connection.

* * * * *